Patented Apr. 1, 1941

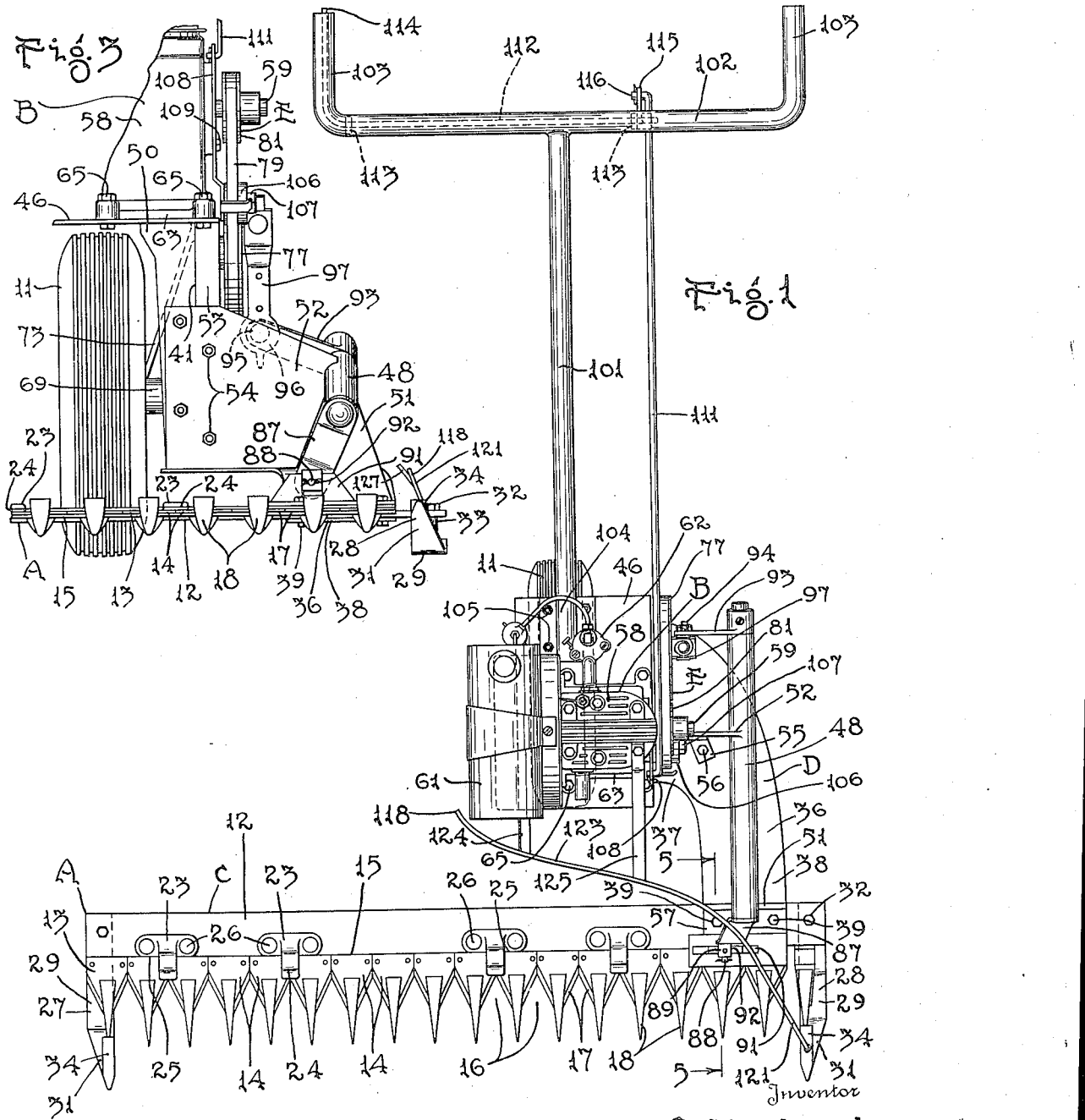

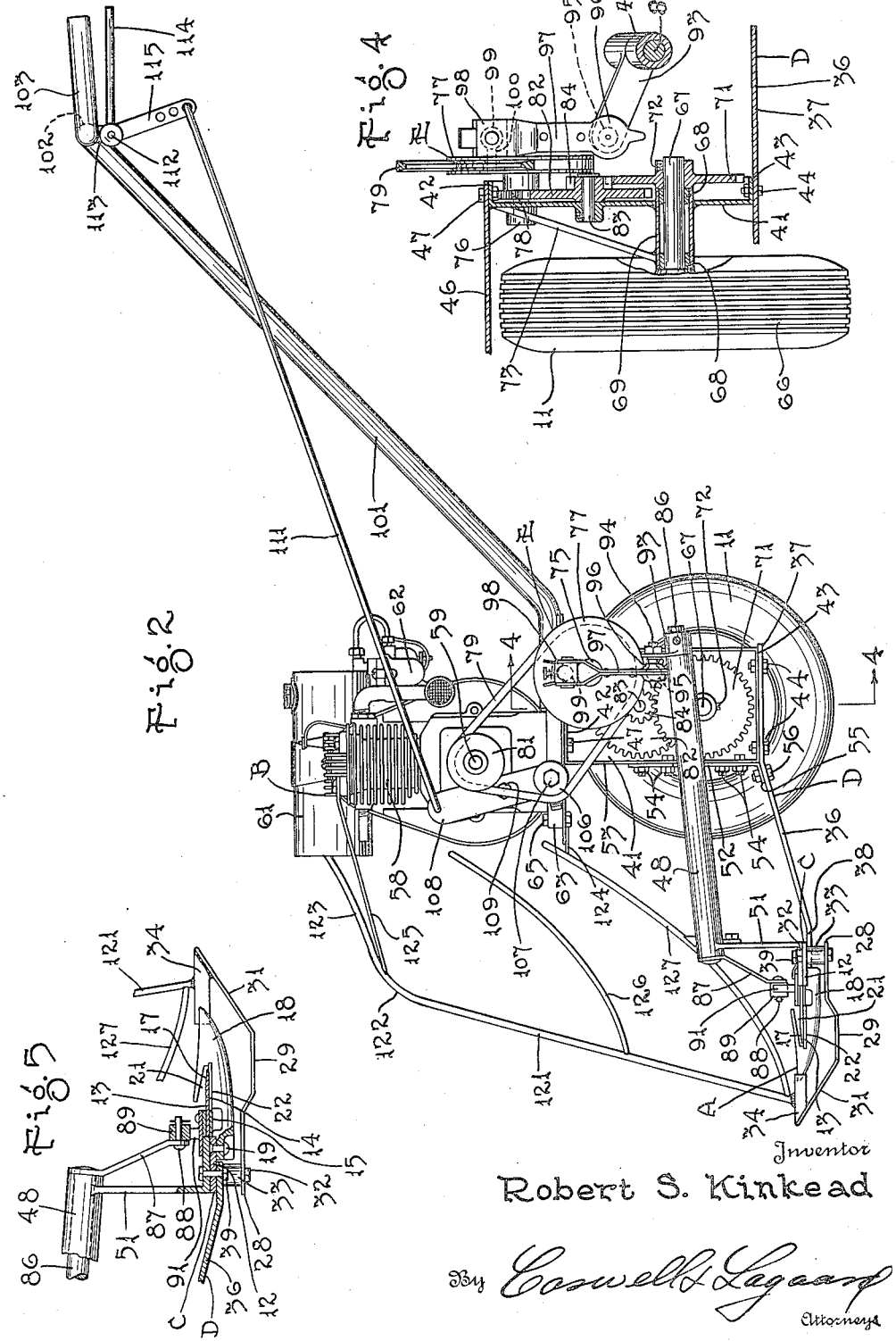

2,237,005

UNITED STATES PATENT OFFICE 2,237,005

MOWER

Robert S. Kinkead, St. Paul, Minn.

Application October 15, 1938, Serial No. 235,176

7 Claims. (Cl. 56—26.5)

My invention relates to mowers of the sickle type and has for an object to provide an extremely simple and practical construction by means of which vegetation may be readily cut by power.

Another object of the invention resides in providing a mower which is easily handled and manipulated.

An object of the invention resides in providing a mower in which the power unit frame is connected to the mower solely at one end of the sickle and the power unit and traction wheel disposed rearwardly of the sickle and intermediate the ends thereof so as to cause a resistance due to cutting on one side of the traction wheel to partially or completely balance the resistance due to cutting on the other side of the traction wheel, whereby the mower may be caused to travel in a desired direction without appreciable, lateral effort, and whereby the mower is completely free at one end to prevent accumulation of cut vegetation on any portion of the power unit or frame and prevent continuous operation thereof.

Another object of the invention resides in constructing the power unit frame with an off-set frame member connected at one end to the sickle frame at a locality laterally of the center of the sickle and preferably near the end thereof and extending toward the center of the sickle at its free end and in mounting the traction wheel and power unit on said frame at a locality intermediate the ends of the sickle and at a distance inwardly from the end of the sickle to which the frame is attached sufficient to reduce the lateral effort required to maintain the mower in its desired course to a suitable degree.

Other objects of the invention reside in the novel combination and arrangement of parts and in the details of construction hereinafter illustrated and/or described.

In the drawings:

Fig. 1 is a plan view of a mower illustrating an embodiment of my invention.

Fig. 2 is an elevational view of the structure shown in Fig. 1.

Fig. 3 is a front elevational view of a portion of the mower shown in Fig. 1.

Fig. 4 is an elevational sectional view taken on line 4—4 of Fig. 2.

Fig. 5 is a cross sectional view taken on line 5—5 of Fig. 1.

My invention comprises a cutting mechanism which I have indicated in its entirety by the reference character A and a power unit B which operates the same. The cutting mechanism A includes a frame C which is constructed with a transversely extending frame member 12. The power unit B is mounted on a frame D which is connected to the frame C laterally of the center thereof. The frame D is partly supported through a supporting wheel 11 mounted thereon. A power transmission E drives the wheel 11 and also the cutting mechanism A. These various parts will now be described in detail.

The frame C of cutting mechanism A, as stated, includes a transversely extending frame member 12 which is constructed in the form of a rectangular bar. All of the parts of the cutting mechanism including the sickle proper are carried by this bar.

The cutting mechanism A includes a sickle 13 which comprises a number of sickle sections or cutters 14 which are arranged adjacent one another and which are riveted or secured to a sickle bar designated by the reference numeral 15. The sections 14 are constructed V-shaped in formation to leave V-shaped notches 16 therebetween into which the grass or vegetation to be cut may enter. The edges 17 of the sickle sections are sharpened so that said edges serve to cut the vegetation when the sickle is reciprocated.

Attached to the under side of the frame member 12 are a number of pointed guards 18 which are secured to said frame member by means of rivets 19. These guards are provided with slots 21 through which the cutters or sickle sections 14 may pass. The said guards have attached to them cutter plates 22 on which the sickle sections rest and which cooperate with said sickle sections to cut the vegetation entering the notches 16. The sickle 13 is held in proper contact with the plates 22 by means of a number of clips 23 which are riveted to the frame member 12 by means of rivets 26. These clips have fingers 24 which overlie the sickle sections or cutters 14 and hold the same in contact with the cutter plates 22. The sickle bar 15 is further guided by means of shoulders 25 formed on the clips 23 and which engage said sickle bar at the rearward edge thereof.

The cutting mechanism A further comprises two shoes 27 and 28, best shown in Figs. 1 and 2. These shoes are formed with runners 29 which rest upon the surface over which the mower travels, said runners having upturned portions 31 at their forward ends. The shoes 27 and 28 are bolted to the frame member 12 by means of bolts 32 which extend jointly through the rearward portions of said shoes and the said frame member. For holding the shoes properly spaced with reference to the frame member 12, spacer sleeves 33 are employed which are disposed between said shoes and frame member and encircle the bolts 32. The forward portions of the shoes 27 and 28 have secured to them rearwardly disposed extensions 34 which engage the end guards 18 of the cutting mechanism and assist in holding the shoes from lateral movement at the forward ends of the same. If desired, the elevation of the shoes 27 and 28 may be varied by using different height spacer sleeves 33.

The frame D consists of a rearwardly extending frame member 36 which is constructed from a plate of sheet material, elongated in form and offset at its rearward end, as designated at 37. The forward end 38 of this frame member underlies the frame member 12 of frame A and is secured thereto by means of bolts 39. The off-set portion 37 of the frame member 36 has secured to it a vertically extending frame member 41. This frame member has upper and lower flanges 42 and 43, the lower flange resting upon the offset portion 37 of frame member 36 and being bolted thereto by means of bolts 44. The frame member 41 has secured to the flange 42 thereof, a horizontally extending frame member 46 which is bolted thereto by means of bolts 47. This frame member is in the nature of a plate or table and supports the power unit B. A brace 50 (Fig. 3) welded to the frame member 41 braces the table 46. Superimposing the frame member 36 is a tubular frame member 48 which extends rearwardly from the sickle A and which is raised above the frame member 36. This tubular frame member has welded to it two braces 51 and 52, the brace 52 being secured to the vertical frame member 41. For this purpose the vertical frame member 41 is constructed with a vertically extending flange 53 which the brace 52 overlies. The said brace is attached to the said flange by means of bolts 54. The brace 52 is constructed with an ear 55 which projects outwardly therefrom, and which overlies the frame member 36. This ear is bolted to the said frame member 36 by means of a bolt 56. The brace 51 is constructed with a flange 57 which overlies the frame member 12. Bolts 39 extend jointly through said flange and frame member and also the forward end 38 of the frame member 36. These bolts hold the various parts rigidly attached to one another.

The power unit B consists of a gasoline engine 58 which is provided with a crank shaft 59, operated in the usual manner from the piston and crank of the engine. The said power unit further includes a gasoline tank 61 which delivers gasoline to a carbureter 62 from which the gasoline is delivered to the engine. The engine 58 includes a base 63 which is bolted to the plate or table 46 by means of bolts 65. The engine is so situated that the crank shaft 59 thereof extends parallel to the sickle bar 15.

The mower is supported rearwardly of the cutting mechanism A by means of the supporting wheel 11, previously referred to. This wheel is preferably a rubber-tired wheel constructed with a stub axle 67 rigidly secured to the web thereof. The axle 67 is rotatably journaled in bearings 68 which are mounted in an axle housing 69. The axle housing 69 extends through and is welded to the vertical frame member 41. A spur gear 71 attached to the end of the axle 67 by means of a set screw 72 holds the axle 67 from endwise movement. A brace 73 welded to the uppermost portion of the frame member 41 and to the axle housing 69 stiffens the entire construction and causes the single supporting wheel 66 to rigidly support the mower. The table 46 extends toward the center of the cutting mechanism A and the tubular axle housing 69 likewise extends in the same direction so that the wheel 66 is disposed inwardly of the ends of the cutting mechanism A and the weight of the power plant B is likewise disposed intermediate the ends of the said cutting mechanism.

The power transmission E comprises a stub shaft 75 which is rigidly attached to a boss 76 formed on the frame member 41. Rotatably mounted on this stub shaft is a sheave 77 which has attached to it a spur pinion 78. A belt 79 passes over the sheave 77 and over another sheave or pulley 81 secured to the crank shaft 59 of engine 58. The spur pinion 78 meshes with a spur gear 82 which is rotatably mounted on another stub shaft 83, secured to the frame member 41 in the same manner as shaft 75. Gear 82 has secured to it a spur pinion 84 which meshes with the gear 71 on axle 67. The various gears 78, 82, 84 and 71 are so arranged that the wheel 11 travels at a greatly reduced speed.

The sickle 13 is operated in the following manner: The tubular frame member 48 forms a housing in which is rotatably mounted a shaft 86. This shaft is journaled in bearings mounted in said housing but which have not been shown in the drawings. The forward end of shaft 86 has welded or otherwise secured to it a depending arm 87 which has pivoted to it, by means of a rivet 88, a block 89. Block 89 is slidably mounted in a slot 92, formed in a lug 91, secured to the sickle bar 15. As the shaft 86 oscillates, arm 87 swings back and forth and the sickle 13 is operated in the customary manner. The rearward end of the shaft 86 has secured to it a laterally extending arm 93. This arm has secured to it a stud 94 formed with a ball 95 at the end of the same. Ball 95 is pivoted for universal movement in a socket 96 formed in the end of a connecting rod 97. A similar socket 98, formed at the other end of said connecting rod, receives a ball 99 formed on a stud 100 similar to the stud 94 which latter stud is attached to the sheave 77. The stud 100 on which ball 99 is formed is eccentrically mounted with respect to the stub shaft 75 so that upon rotation of the sheave 77 the said ball operates as a crank and reciprocates the connecting rod 97. Connecting rod 97 in turn oscillates the arm 93 and causes the sickle 13 to operate.

For controlling the operation of the mower, a handle 101 is employed. This handle inclines rearwardly and is formed with a handle bar 102 extending transversely of the rearward end thereof. Hand grips 103 issue from the ends of said handle bar. The forward end of the handle 101 is held attached to the table 46 by means of a plate 104 which is bolted to said table by means of bolts 105. In this manner the handle is rigidly connected to the frame D and the tractor may be steered by means of the same. The handle 101 is positioned over the supporting wheel 11 so that ready control of the mower may be had.

To stop and start the mower an idler sheave 106 is employed which is rotatably mounted on a stud 107 secured to a lever 108. Lever 108 is pivoted by means of a bolt 109 attached to a part of the engine 58. The other end of the lever 108 has pivoted to it a control rod 111 which extends rearwardly and upwardly toward the handle bar 102. Mounted for oscillation with respect to the handle bar 102 is a shaft 112 which extends parallel therewith. This shaft is journaled in two bearings 113 depending from said handle bar. One end of the shaft 112 has formed on it a hand grip 114 which follows along the hand grip 103 on handle bar 102. The other end of this shaft has secured to it a depending arm 115 to which the rearward end of rod 111 is pivoted. Said rod may be bent with an angular portion 116 as shown in Fig. 1 for the purpose. It will readily be comprehended that movement of the hand grip 114 toward the hand grip 103 moves the sheave 106 is a manner to tighten the belt 79 thus affording a drive between the sheave 81 and sheave 77. In this manner the mower may be stopped or started, as desired.

Operating in conjunction with the cutting mechanism A is a deflector 118. This deflector consists of a vertically extending rod 121 which is welded at its lowermost end to the extension 34 of shoe 28. This rod is bent, as indicated at 122, to form a rearwardly extending deflector member 123, arranged as best shown in Fig. 1. The deflector member 123 has welded to it two braces 124 and 125 which are attached to the engine 58. These braces hold the upper end of the said deflector member in proper position. In conjunction with the deflector member 123 two other deflector members 126 and 127 are provided which are welded to the rod 121. Deflector member 126 is attached to said rod intermediate the ends thereof, while the deflector member 127 is connected to the said rod at the lowermost end thereof. The deflector 118 serves to shift the vegetation cut by the mower toward the left as viewed in Fig. 1 when the mower is operated in the customary manner.

The method of operating my invention is as follows: Engine 58 is started in the usual manner with hand grip 114 released. The engine then idles. By gripping the hand grip 103 and tilting the mower back on wheel 11, the mower can be manually manipulated and brought to the position where cutting is desired. The weight of the cutting mechanism A being heavier than the handle 101 and attached parts, and due to the fact that the engine 58 is situated forwardly of the axle of wheel 11, considerable weight is thrown upon the cutting mechanism A which urges the same toward the ground. This mechanism rests upon the two shoes 27 and 28. When the mower is in proper position if the hand grip 114 is raised idler sheave 106 is brought into engagement with the belt 79 and traction between said belt and sheaves 81 and 77 is procured. This simultaneously drives the wheel 11 and operates the sickle 13. The mower now travels along the ground cutting the vegetation in front of the same. As the vegetation is cut the deflectors 123, 126 and 127 deflect the vegetation from the right hand side of the cutting mechanism A, as viewed in Fig. 1, past the power unit B. It will be noted that the left hand side of the cutting mechanism is entirely free so that the vegetation cut falls directly in back of the cutting mechanism. Further, it will be noted that there is nothing on which the cut vegetation can lie so that as soon as the vegetation is cut the same is clear of the sickle and cutting mechanism. It will also be noted that the deflector referred to throws the vegetation toward the clear end of the cutting mechanism so that no vegetation can pile upon the frame member 36. In this manner a clear swath is cut of the full width of the sickle. Due to the fact that the wheel 11 is disposed intermediate the ends of the sickle the mower is easily manipulated. I have found that, where the wheel is situated from the center of the cutting mechanism a distance not over one-sixth of the length of the cutting mechanism, steering of the mower is not rendered difficult. I have also found that, as the supporting wheel is moved beyond this distance, the steering of and manipulation of the mower becomes rapidly more difficult and when the supporting wheel is at one end of the cutting mechanism steering and manipulation is exceedingly difficult. I have found that the handle for the mower may be placed anywheres from between the center of the cutting mechanism to the center of the wheel without appreciably changing the ease with which the mower may be manipulated and operated.

The advantages of my invention are manifest. An extremely simple and practical construction has been provided which will perform almost as efficiently and effectively as mowers of two and three times the weight of the instant invention. By means of the specific framework shown, a substantially balanced construction is provided which makes the mower easy to manipulate and handle. With my invention the power unit frame is attached to the frame of the cutting mechanism at one end thereof so as to leave the remainder of the cutting mechanism free to allow the cut vegetation to readily pass over the same. Through the use of the deflector employed the cut vegetation ahead of the power unit and supporting wheel is deflected laterally thereof and toward the free end of the cutting mechanism so that no obstruction to the free travel of the mower results. By means of the particular drive mechanism employed for the mower, the housing thereof is used as part of the frame and serves to stiffen and reinforce the frame member with which it is associated. My improved mower can be constructed at an extremely low cost.

Changes in the specific form of my invention, as herein disclosed, may be made within the scope of what is claimed without departing from the spirit of my invention.

Having described my invention, what I claim as new and desire to protect by Letters Patent is:

1. A mower comprising a sickle and a frame therefor, a rearwardly extending frame member connected to said frame laterally of the center of said sickle, a vertical frame member issuing upwardly from said rearwardly extending frame member, a horizontal frame member connected to the upper end of said vertical frame member, braces connecting said frame members together, a traction wheel carried by said last named vertical frame member, a power unit carried by said last named horizontal frame member, means for driving said traction wheel from said power unit and means for driving said sickle.

2. A mower comprising a sickle and a frame therefor, a rearwardly extending frame member connected to said frame laterally of the center of said sickle, a second rearwardly extending frame member situated above said first named frame member, a vertical frame member issuing upwardly from said first named rearwardly extending frame member, a horizontal frame member connected to the upper end of said vertical frame member, braces connecting said frame member together, a traction wheel carried by said last named vertical frame member, a power unit carried by said last named horizontal frame member, means for driving said traction wheel from said power unit, and transmission means driven from said power unit and extending along said second named frame member for operating said sickle.

3. A mower comprising a sickle and a frame therefor, a single traction wheel disposed rearwardly of the sickle and intermediate the ends thereof, a second frame supported by said wheel and connected to said sickle frame at a single locality laterally of the center of said sickle, a power unit carried by said second frame, a deflector connected to said sickle frame in proximity to the end thereof at which second frame is connected thereto, said deflector extending rearwardly and laterally toward said wheel to deflect vegetation cut toward the end of the sickle frame opposite from that to which said second named frame is connected and away from said traction wheel and power unit, means for driving said traction wheel from said power unit and means for driving said sickle.

4. A mower comprising a sickle and a frame therefor, a single traction wheel disposed rearwardly of the sickle and in proximity to the center thereof, a second frame supported by said wheel and connected to said sickle frame solely at one end of the sickle frame, a power unit supported by said wheel, means for driving said wheel from said power unit and means for driving said sickle.

5. A mower comprising a sickle and a frame therefor, a single traction wheel disposed rearwardly of the sickle and with its medial plane situated within at a locality defined by the center of the sickle frame and a point spaced one-sixth of the width of the sickle therefrom, a second frame supported by said wheel and connected by said sickle frame solely at one end of the sickle frame, a power unit supported by said wheel, means for driving the traction wheel from the power unit and means for driving said sickle.

6. A mower comprising a sickle and a frame therefor, a single traction wheel disposed rearwardly of the sickle and in proximity to the center thereof, a second frame supported by said wheel and connected to said sickle frame laterally of the center of the sickle, a deflector carried by one of said frames and connected in proximity to the locality of connection of the second frame to the sickle frame and extending rearwardly and laterally toward said wheel, said deflector serving to deflect vegetation cut by the sickle toward the end of the sickle frame opposite from that to which said second named frame is connected and away from said traction wheel, means for driving said traction wheel and means for driving said sickle.

7. A mower comprising a sickle and a frame therefor, a single traction wheel disposed rearwardly of the sickle and in proximity to the center thereof, a second frame having a rear portion issuing rearwardly from one end of the sickle frame and a lateral portion extending laterally from said rear portion and supported by said wheel, said wheel being disposed entirely on the side of said frame nearest the center of the mower, said second frame being free from the opposite end of the sickle and a power unit supported by said wheel and driving the same, said power plant being disposed above said wheel and largely on the side of said wheel away from the center of the mower.

ROBERT S. KINKEAD.